(12) United States Patent
Konno et al.

(10) Patent No.: US 10,647,817 B2
(45) Date of Patent: May 12, 2020

(54) METHOD OF PRODUCING POLYARYLENE SULFIDE

(71) Applicant: Kureha Corporation, Tokyo (JP)

(72) Inventors: Akihiro Konno, Tokyo (JP); Ken-Ichi Takaki, Tokyo (JP); Haruki Mokudai, Tokyo (JP); Hiroyuki Sato, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 15/761,120

(22) PCT Filed: Sep. 30, 2016

(86) PCT No.: PCT/JP2016/079127
§ 371 (c)(1),
(2) Date: Mar. 19, 2018

(87) PCT Pub. No.: WO2017/057733
PCT Pub. Date: Apr. 6, 2017

(65) Prior Publication Data
US 2018/0265636 A1  Sep. 20, 2018

(30) Foreign Application Priority Data

Sep. 30, 2015 (JP) ................................. 2015-195115

(51) Int. Cl.
*C08G 75/025* (2016.01)
*C08G 75/0209* (2016.01)

(52) U.S. Cl.
CPC ....... *C08G 75/025* (2013.01); *C08G 75/0209* (2013.01)

(58) Field of Classification Search
CPC .............. C08G 75/025; C08G 75/0209; C08G 75/0204
See application file for complete search history.

(56) References Cited

U.S. PATENT DOCUMENTS

| | | | | |
|---|---|---|---|---|
| 5,789,533 A * | 8/1998 | Yamanaka | ......... | C08G 75/0254 528/388 |
| 7,220,817 B2 | 5/2007 | Matsuzaki et al. | | |
| 7,834,133 B2 | 11/2010 | Suzuki | | |
| 8,138,302 B2 | 3/2012 | Sato | | |
| 8,183,336 B2 | 5/2012 | Sato et al. | | |
| 2005/0228095 A1* | 10/2005 | Onishi | ..................... | C08K 3/01 524/425 |
| 2006/0074219 A1* | 4/2006 | Kawama | ............ | C08G 75/0259 528/388 |
| 2006/0084785 A1 | 4/2006 | Sato et al. | | |
| 2007/0093642 A1 | 4/2007 | Sato et al. | | |
| 2007/0265425 A1* | 11/2007 | Suzuki | ................. | C08G 75/025 528/388 |
| 2010/0210813 A1* | 8/2010 | Foder | ................. | C08G 75/0209 528/388 |
| 2016/0280859 A1* | 9/2016 | Chiong | ................. | C08G 75/14 |

FOREIGN PATENT DOCUMENTS

| | | |
|---|---|---|
| CN | 1668674 A | 9/2005 |
| CN | 1732211 A | 2/2006 |
| CN | 1742037 A | 3/2006 |
| CN | 101048443 A | 10/2007 |
| JP | 2004244619 A | 9/2004 |
| JP | 2005225931 A | 8/2005 |
| JP | 2014047218 A | 3/2014 |
| WO | WO2004060972 A1 | 7/2004 |
| WO | WO2005063853 A1 | 7/2005 |
| WO | WO2006046748 A1 | 5/2006 |

OTHER PUBLICATIONS

International Search Report for PCT/JP2016/079127 dated Nov. 15, 2016.
First Office Action from the Korean Intellectual Property Office for KR10-2018-7005894/PCT/JP2016/079127 dated Jul. 5, 2018.
English translation of the International Preliminary Report on Patentability for International Application PCT/JP2016/079127 dated Apr. 3, 2018.
First Office Action from the State Intellectual Property Office of China for CN201680050184.X/JPPCT/JP2016/079127 dated Jul. 31, 2018.
Search Report from the State Intellectual Property Office of China for CN201680050184.X/Jppct/JP2016/079127 dated Jul. 23, 2018.
Office Action issued to KR Patent Application No. 10-2018-7005894, dated Jul. 5, 2018 (Complete Translation).
Office Action issued to CN Patent Application No. 201680050184.X, dated Jul. 31, 2018 (Complete Translation).

* cited by examiner

*Primary Examiner* — Ali Z Fadhel
(74) *Attorney, Agent, or Firm* — Abel Schillinger, LLP

(57) ABSTRACT

The present invention is to provide a method that can produce polyarylene sulfide having a high viscosity at a high yield. The method of producing polyarylene sulfide according to an embodiment of the present invention includes: a preparation step of preparing a mixture containing an organic amide solvent, a sulfur source, a dihalo aromatic compound, and an alkali metal hydroxide; a first-stage polymerization step of initiating a polymerization reaction by heating the mixture and producing a prepolymer until a pH of a reaction system reaches a range of 10 to 11; and a second-stage polymerization step of continuing the polymerization reaction.

7 Claims, No Drawings

METHOD OF PRODUCING POLYARYLENE SULFIDE

TECHNICAL FIELD

The present invention relates to a method of producing polyarylene sulfide.

BACKGROUND ART

Polyarylene sulfide (hereinafter, also referred to as "PAS"), represented by polyphenylene sulfide (hereinafter, also referred to as "PPS"), is an engineering plastic having excellent heat resistance, chemical resistance, flame retardancy, mechanical strength, electrical characteristics, dimensional stability, and the like. PAS has been widely used in a wide variety of fields, such as electric/electronic devices and devices for automobiles, because PAS can be formed into various shaped products, films, sheets, fibers, and the like by ordinary melt processing methods, such as extrusion molding, injection molding, and compression molding.

As a representative method of producing PAS, a method in which a sulfur source and a dihalo aromatic compound are reacted in an organic amide solvent such as N-methyl-2-pyrrolidone (hereinafter, also abbreviated as "NMP") has been known (e.g. methods described in Patent Documents 1 and 2).

CITATION LIST

Patent Literature

Patent Document 1: JP 2014-047218 A
Patent Document 2: WO 2006/046748

SUMMARY OF INVENTION

Technical Problem

It has been desired to obtain PAS having high viscosity at high yield in the related art, and there is room for enhancement of the yield because of occurrence of side reactions and the like.

The present invention is made to solve the problems described above, and a main object is to provide a method of producing PAS that can produce PAS having a high viscosity at a high yield.

Solution to Problem

As a result of diligent research to achieve the object described above, the inventors of the present invention discovered that the problems described above can be solved by allowing production of prepolymer until the pH of a reaction system reaches a range of 10 to 11 in a first-stage polymerization step of a method of producing PAS, and thus completed the present invention. That is, the method of producing PAS according to an embodiment of the present invention can be described as follows.

The method of producing PAS according to an embodiment of the present invention includes, in a method of producing polyarylene sulfide that polymerizes a sulfur source and a dihalo aromatic compound in an organic amide solvent, a preparation step of preparing a mixture containing an organic amide solvent, a sulfur source, a dihalo aromatic compound, and an alkali metal hydroxide; a first-stage polymerization step of initiating a polymerization reaction by heating the mixture and producing a prepolymer until a pH of a reaction system reaches a range of 10 to 11; and a second-stage polymerization step of continuing the polymerization reaction.

In the method of producing PAS according to an embodiment of the present invention, in a preparation step, a mixture containing the alkali metal hydroxide in an amount that is less than an equimolar amount per 1 mol of the sulfur source is preferably prepared; and in a second-stage polymerization step, from 0.01 to 0.6 mol of alkali metal hydroxide per 1 mol of the sulfur source is added preferably at once or intermittently or continuously and the polymerization reaction is preferably continued.

In the method of producing PAS according to an embodiment of the present invention, in the first-stage polymerization step, the prepolymer is preferably produced until a conversion ratio of the dihalo aromatic compound reaches 50% or greater.

In the method of producing PAS according to an embodiment of the present invention, in the preparation step, a mixture containing from 0.5 to 0.99 mol of the alkali metal hydroxide per 1 mol of the sulfur source is preferably prepared.

In the method of producing PAS according to an embodiment of the present invention, the polymerization reaction is performed by heating the mixture prepared in the preparation step at a temperature of 170 to 270° C. in the first-stage polymerization step, and then the polymerization reaction is preferably continued by heating the mixture at a temperature of 245 to 290° C. in the second-stage polymerization step.

In the method of producing PAS according to an embodiment of the present invention, in the second-stage polymerization step, the polymerization reaction is preferably continued in a condition where the reaction system is phase-separated into a concentrated polymer phase and a dilute polymer phase in the presence of a phase separation agent.

In the method of producing PAS according to an embodiment of the present invention, in the first-stage polymerization step and the second-stage polymerization step, the polymerization reaction is preferably performed in a homogeneous liquid phase condition.

Advantageous Effects of Invention

According to an embodiment of the present invention, a method that can produce PAS having a high viscosity at a high yield can be provided.

DESCRIPTION OF EMBODIMENTS

Method of Producing PAS

An embodiment of the method of producing PAS according to the present invention is described below. The method of producing PAS of the present embodiment includes, as main steps, a preparation step, a first-stage polymerization step, and a second-stage polymerization step. Furthermore, as desired, the method may also include a dehydration step and/or a post-treatment step. Each of the steps will be described in detail below.

Dehydration Step

The dehydration step is a step that discharges a distillate containing water from the reaction system during the polymerization reaction to the outside the reaction system before the preparation step. The reaction system contains a mixture containing an organic amide solvent, a sulfur source, and an alkali metal hydroxide.

The polymerization reaction of the sulfur source and the dihalo aromatic compound is affected, e.g., promoted or inhibited, by the amount of water present in the polymerization reaction system. Therefore, as long as the water content is a water content that does not inhibit the polymerization reaction, the dehydration step is not necessary. However, the water content of the polymerization reaction system is preferably reduced by performing the dehydration step before the polymerization.

In the dehydration step, the dehydration is preferably performed by heating in an inert gas atmosphere. The dehydration step is typically performed in a reaction vessel, and the distillate containing water is discharged outside the reaction vessel. Water to be dehydrated in the dehydration step includes hydrated water contained in the raw materials charged in the dehydration step, an aqueous medium of the aqueous mixture, water produced by a side reaction between the raw materials, and the like.

The heating temperature in the dehydration step is not limited as long as the heating temperature is 300° C. or lower but is preferably from 100 to 250° C. The heating time is preferably from 15 minutes to 24 hours, and more preferably from 30 minutes to 10 hours.

In the dehydration step, the dehydration is performed until the water content reaches a predetermined range. That is, in the dehydration step, the dehydration is preferably performed until the content becomes preferably 0 to 2 mol, and more preferably from 0.5 to 1.8 mol, per 1 mol of the effective sulfur source. When the water content is too small in the dehydration step, the water content needs to be adjusted to a desired content by adding water in the preparation step performed before the polymerization step.

Preparation Step

The preparation step is a step that prepares a mixture containing an organic amide solvent, a sulfur source, a dihalo aromatic compound, and an alkali metal hydroxide. The mixture prepared in the preparation step is also referred to as "preparation mixture".

As described above, the dehydration step is preferably performed before the preparation step. Therefore, controlling of the pH and adjustment of the amount of each component in the preparation mixture are performed taking the amounts of the components in the mixture obtained in the dehydration step into consideration. Furthermore, the amount of the sulfur source in the preparation mixture (hereinafter, also referred to as the amount of "charged sulfur source" (effective sulfur source)) can be calculated by subtracting the molar quantity of the hydrogen sulfide volatilized in the dehydration step from the molar quantity of the sulfur source charged in the dehydration step.

The number of moles of the alkali metal hydroxide per 1 mol of the sulfur source (charged sulfur source) is preferably less than an equimolar amount, more preferably in a range of 0.5 to 0.99 mol, even more preferably 0.7 to 0.98 mol, yet even more preferably 0.75 to 0.97 mol, and particularly preferably 0.78 mol or greater but less than 0.95 mol. The number of moles of the alkali metal hydroxide is calculated based on the number of moles of the alkali metal hydroxide added in the preparation step. In the case where the dehydration step is performed, the number of moles of the alkali metal hydroxide is calculated based on the number of moles of the alkali metal hydroxide added in the dehydration step and the number of moles of the alkali metal hydroxide generated due to generation of hydrogen sulfide in the dehydration step. When the sulfur source contains an alkali metal sulfide, the number of moles of the alkali metal hydroxide per 1 mol of the sulfur source (charged sulfur source) is calculated in a manner that the number of moles of the alkali metal sulfide is included. When the sulfur source contains hydrogen sulfide, the number of moles of the alkali metal hydroxide per 1 mol of the sulfur source (charged sulfur source) is calculated in a manner that the number of moles of the generated alkali metal sulfide is included. However, the number of moles of the alkali metal hydroxide added for other purposes, such as the number of moles of the alkali metal hydroxide in the case where the organic carboxylic acid metal salt is used in a form of a combination of an organic carboxylic acid and an alkali metal hydroxide as a polymerization aid and/or a phase separation agent, is not included in the number of moles of the alkali metal hydroxide per 1 mol of the sulfur source (charged sulfur source). Furthermore, in the case where at least one type of acid selected from the group consisting of inorganic acids and organic acids is used for some reasons, the number of moles of the alkali metal hydroxide required to neutralize the at least one type of acid is not included in the number of moles of the alkali metal hydroxide per 1 mol of the sulfur source (charged sulfur source).

In the case where the dehydration step is performed, as necessary, in the preparation step, an alkali metal hydroxide and water can be added to the mixture remaining in the system after the dehydration step. In particular, the alkali metal hydroxide is preferably added such that the number of moles of the alkali metal hydroxide is less than 1 mol per 1 mol of the sulfur source (charged sulfur source) taking the amount of the hydrogen sulfide generated during the dehydration and the amount of the alkali metal hydroxide generated during the dehydration into account.

When the number of moles of the alkali metal hydroxide per 1 mol of the sulfur source is less than 1 mol, generation of byproducts during polymerization reaction may be suppressed, the nitrogen content derived from impurities in the produced PAS may be made sufficiently small, and the yield of the PAS may be sufficiently enhanced. In the preparation step, a preparation mixture containing preferably from 0.95 to 1.2 mol, and more preferably from 1 to 1.09 mol, of the dihalo aromatic compound per 1 mol of the sulfur source is preferably prepared.

The pH of the preparation mixture is not limited but is preferably higher than 12.5 but 14 or lower, more preferably from 12.6 to 14, and even more preferably from 12.7 to 13.9. The value of pH may be a predetermined value achieved by adjusting the proportion of each of the components such as alkali metal hydroxide. The pH can be easily adjusted to a value higher than 12.5 by setting the number of moles of the alkali metal hydroxide per 1 mol of the sulfur source (charged sulfur source) to within the range described above. As a result, the polymerization reaction can be stably performed while the generation of byproducts is suppressed, and a high quality PAS can be easily obtained. In the method of producing PAS according to an embodiment of the present invention, the polymerization reaction between the sulfur source and the dihalo aromatic compound is initiated by heating the preparation mixture in the first-stage polymerization step described below. When the pH of the preparation mixture is 12.5 or less at the beginning of the first-stage polymerization, it may be difficult to obtain high quality PAS even when an alkali metal hydroxide is added in the middle of the first-stage polymerization. Note that, when the pH of the preparation mixture is too high, deterioration in the organic amide solvent may be increased and abnormal reaction and/or decomposition reaction may occur during the polymerization as a result of too high abundance of the alkali metal hydroxide.

Note that, as the organic amide solvent, the sulfur source, the dihalo aromatic compound, and the alkali metal hydroxide, those typically used in production of PAS can be used. Examples of the organic amide solvent include amide compounds, such as N,N-dimethylformamide and N,N-dimethylacetamide; N-alkylcaprolactam compounds, such as N-methyl-ε-caprolactam; N-alkylpyrrolidone compounds or N-cycloalkylpyrrolidone compounds, such as N-methyl-2-pyrrolidone (NMP) and N-cyclohexyl-2-pyrrolidone; N,N-dialkylimidazolidinone compounds, such as 1,3-dialkyl-2-imidazolidinone; tetraalkyl urea compounds, such as tetramethyl urea; and hexaalkylphosphate triamide compounds, such as hexamethyl phosphate triamide.

Examples of the sulfur source include alkali metal sulfide, alkali metal hydrosulfide, and hydrogen sulfide.

Examples of the alkali metal hydrosulfides include lithium hydrosulfide, sodium hydrosulfide, potassium hydrosulfide, rubidium hydrosulfide, and cesium hydrosulfide. Examples of the dihalo aromatic compounds include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, and dihalodiphenyl ketone. A halogen atom is each atom of fluorine, chlorine, bromine, and iodine, and the two halogen atoms in the dihalo aromatic compound may be the same or different.

As the alkali metal hydroxide, lithium hydroxide, sodium hydroxide, potassium hydroxide, rubidium hydroxide, and cesium hydroxide can be used.

These materials may be used alone or may be used by mixing two or more types as long as the combination can produce the PAS.

Polymerization Step

The polymerization step is a step that polymerizes a polyarylene sulfide (PAS) by subjecting the sulfur source and the dihalo aromatic compound to a polymerization reaction. The polymerization step includes two steps which are a first-stage polymerization step and a second-stage polymerization step. Each of the steps will be described below.

First-Stage Polymerization Step

The first-stage polymerization step is a step of initiating a polymerization reaction by heating the mixture and producing a prepolymer until the pH of a reaction system reaches a range of 10 to 11. When the pH of the reaction system is in a range of 10 to 11 in the first-stage polymerization step, side reactions tend to be suppressed, and the melt viscosity of the obtained PAS is less likely to be reduced. Therefore, PAS having a high viscosity can be obtained at a high yield.

To control the pH to a desired range, the amount of the alkali metal hydroxide is preferably controlled to a discretionary amount of less than equimolar amount per 1 mol of the sulfur source during the preparation. Alternatively, the pH may be controlled by adding an inorganic acid and/or an organic acid after the reaction is initiated by using the alkali metal hydroxide amount of not less than the equimolar amount per 1 mol of the sulfur source.

The polymerization reaction may be carried out in batches, continuous mode or a combination of both methods. In the batch polymerization, a method in which two or more reaction vessels are used may be employed to shorten the polymerization cycle time. In the first-stage polymerization step and the second-stage polymerization step, the polymerization reaction may be performed in a condition where the PAS and the organic amide solvent are in a homogeneous phase, or the polymerization reaction may be performed in a condition where the PAS and the organic amide solvent are liquid-liquid phase-separated. In many cases, in the first-stage polymerization step, the polymerization reaction is performed in the reaction system in which the produced polymer is uniformly dissolved in the organic amide solvent.

In the first-stage polymerization step, polymerization reaction is preferably performed by heating the mixture prepared in the preparation step, i.e. the preparation mixture, to a temperature of 170 to 270° C. The polymerization temperature in the first-stage polymerization step is preferably selected from the range of 180 to 265° C. from the perspective of suppressing side reactions and decomposition reactions.

The dihalo aromatic compound conversion ratio is preferably 50% or greater, more preferably from 50 to 98%, even more preferably from 55 to 97%, and particularly preferably from 60 to 95%. The conversion ratio of the dihalo aromatic compound can be calculated by determining the amount of the dihalo aromatic compound remaining in the reaction mixture by gas chromatography and then performing calculation based on the remaining amount of the dihalo aromatic compound, the charged amount of the dihalo aromatic compound, and the charged amount of the sulfur source.

In the first-stage polymerization step, the preparation mixture having a pH of higher than 12.5 but 14 or lower is preferably used to initiate the polymerization reaction. As long as this condition is employed, the amount of at least one of water, the alkali metal hydroxide, and the organic amide solvent may be varied in the middle of the polymerization reaction. For example, water and the alkali metal hydroxide may be added to the reaction system in the middle of the polymerization. However, in the first-stage polymerization step, typically, the preparation mixture prepared in the preparation step is preferably used to initiate the polymerization reaction and terminate the first-stage polymerization reaction.

Second-Stage Polymerization Step

The second-stage polymerization step is a step that continues the polymerization reaction.

For the polymerization temperature in the second-stage polymerization step, the polymerization reaction is continued by heating to preferably 245 to 290° C., and more preferably 257 to 285° C. The polymerization temperature may be maintained at a fixed temperature or may be increased or decreased stepwise as necessary. The polymerization temperature is preferably maintained at a fixed temperature from the perspective of controlling the polymerization reaction. The polymerization reaction time is typically in the range of from 10 minutes to 72 hours, and preferably from 30 minutes to 48 hours.

In the second-stage polymerization step, the amount of the added alkali metal hydroxide is preferably from 0.01 to 0.6 mol, more preferably from 0.02 to 0.4 mol, even more preferably from 0.03 to 0.35 mol, and particularly preferably from 0.06 to 0.3 mol, per 1 mol of the sulfur source. In the second-stage polymerization step, the alkali metal hydroxide is preferably added in a regulated manner that the total amount of the alkali metal hydroxide is preferably from 1.00 to 1.1 mol, more preferably from 1.01 to 1.08 mol, and even more preferably from 1.02 to 1.06 mol, per 1 mol of the sulfur source. When the total amount of the alkali metal hydroxide per 1 mol of the sulfur source is too small, PAS having a desired degree of polymerization may not be obtained. The total amount of the alkali metal hydroxide is the total of the amount of the alkali metal hydroxide present in the preparation mixture, the amount of the alkali metal hydroxide added in the second-stage polymerization step, and the amount of the alkali metal hydroxide optionally added in the first-stage polymerization step.

The time at which the alkali metal hydroxide is added may be at the beginning of the second-stage polymerization step or in the middle of the second-stage polymerization step. Furthermore, the alkali metal hydroxide may be added at once or intermittently or continuously. When the alkali metal hydroxide is not added in the second-stage polymerization step, formation of byproducts may not be suppressed, the amount of impurities may be increased, and it may become difficult to stably obtain PAS having a high melt viscosity.

In the second-stage polymerization step, the phase-separated polymerization, in which the polymerization reaction is continued in a condition where a concentrated polymer phase and a dilute polymer phase are phase-separated in a reaction system, is preferably performed in the presence of a phase separation agent. Specifically, by adding a phase separation agent, the polymerization reaction system (polymerization reaction mixture) is phase-separated into the concentrated polymer phase (phase mainly containing dissolved PAS) and the dilute polymer phase (phase mainly containing organic amide solvent). The phase separation agent may be added at the beginning of the second-stage polymerization step. The phase separation agent may also be added in the middle of the second-stage polymerization step such that the phase separation occurs in the middle of the second-stage polymerization step. Note that, although the phase separation agent may be present not only in the second-stage polymerization step, the phase separation agent is preferably used in the second-stage polymerization step.

As the phase separation agent, at least one type selected from the group consisting of organic carboxylic acid metal salts, organic sulfonic acid metal salts, alkali metal halides, alkaline earth metal halides, alkaline earth metal salts of aromatic carboxylic acids, phosphoric acid alkali metal salts, alcohols, paraffin hydrocarbons, and water can be used. Among these, water is preferable because of low cost and ease in post-treatment. Furthermore, a combination of the organic carboxylic acid salt and water is also preferable. The salts may be in forms obtained by separately adding corresponding acids and bases.

The amount of the phase separation agent to be used varies depending on the type of compound to be used, and the amount is typically in a range of 0.01 to 20 mol per 1 kg of the organic amide solvent. In particular, in the second-stage polymerization step, a method, in which water as the phase separation agent is added in a manner that the water content in the reaction system is greater than 4 mol but 20 mol or less per 1 kg of the organic amide solvent, is preferably employed. When water is added as the phase separation agent in the second-stage polymerization step, the water is preferably added in a manner that the water content in the reaction system is more preferably from 4.1 to 14 mol, and particularly preferably from 4.2 to 10 mol, per 1 kg of the organic amide solvent.

PAS Polymerization Reaction Solution

In an embodiment of the present invention, generation of byproduct is suppressed in the method of producing PAS that polymerizes the sulfur source and the dihalo aromatic compound in the organic amide solvent in the PAS polymerization reaction solution after the initiation of the polymerization reaction (hereinafter, also simply referred to as "PAS polymerization reaction solution"). Note that the byproduct refers to chlorophenyl methyl amino butanoic acid (hereinafter, also referred to as "CPMABA") and phenol. In the PAS polymerization reaction solution, the content of the CPMABA is 16000 ppm or less. Furthermore, the content of the phenol is suppressed to 2100 ppm or less. Therefore, according to the method of producing PAS of an embodiment of the present invention, the PAS having an average particle size of 10 to 5000 µm, a melt viscosity of 0.1 to 3000 Pa·s measured at a temperature of 310° C. and a shear rate of 1216 sec$^{-1}$, and a nitrogen content of 600 ppm or less described below, can be obtained at a high yield. In the method of producing PAS of an embodiment of the present invention, the yield of the PAS is preferably 85% or greater, more preferably 87% or greater, and particularly preferably 88%. The upper limit of the yield of the PAS is not limited and may be 100% or less, 99%, or 95%.

Hereinafter, the produced amount of CPMABA and phenol in the PAS polymerization reaction solution and the measurement method thereof are described.

Produced Amount of CPMABA

The produced amount of CPMABA in the PAS polymerization reaction solution is preferably 9000 ppm or less, more preferably 8000 ppm or less, and particularly preferably 7000 ppm or less. The lower limit of the produced amount of CPMABA is preferably 0 ppm but may be approximately 100 ppm.

The content of CPMABA in the PAS polymerization reaction solution (hereinafter, also referred to as "produced amount of CPMABA") can be measured by the following method.

A slurry content that is in the reactor and that contains the PAS after the completion of the polymerization reaction is cooled to room temperature, and then, using a part thereof, only a liquid component is isolated via centrifugal separation. The isolated liquid component is precisely weighed in a volumetric flask, mixed with an aqueous solution having 40 mass % of acetonitrile content, and then agitated to extract CPMABA. The solution in which the CPMABA is extracted is filtered using a membrane filter, and the content of the CPMABA is measured using this filtrate as a measurement sample. The measurement is performed by using the synthesized CPMABA as a standard substance by high-performance liquid chromatography (HPLC) to quantify the CPMABA in the measurement sample, and this quantity is used as the produced amount of the CPMABA (unit: ppm). Thereafter, as necessary, the number of moles of the CPMABA per 1 mol of the sulfur source may be calculated and used as the produced amount of the CPMABA (unit: mmol/mol), which is a byproduct.

Produced Amount of Phenol

The produced amount of phenol in the PAS polymerization reaction solution is preferably 2100 ppm or less, and more preferably 2000 ppm or less. The lower limit of the produced amount of phenol is preferably 0 ppm but may be approximately 100 ppm.

The content of phenol in the PAS polymerization reaction solution (hereinafter, also referred to as "produced amount of phenol") can be measured by the following method.

That is, a slurry content that is in the reactor and that contains the PAS after the completion of the polymerization reaction is cooled to room temperature, and then, using a part thereof, only a liquid component is isolated via centrifugal separation. The liquid component is precisely weighed in a volumetric flask, mixed with acetone, and then agitated to extract phenol. The content of the phenol was measured using the solution in which the phenol was extracted as a measurement sample. The measurement is performed by using phenol, available from Wako Pure Chemical Industries, Ltd., as a standard substance by gas chromatography (GC) to quantify the phenol in the measurement sample, and this quantity was used as the produced amount of the phenol (unit: ppm). Thereafter, as necessary, the number of moles of the phenol per 1 mol of the sulfur source may be calculated and used as the produced amount of the phenol (unit: mmol/mol), which is a byproduct.

Post-Treatment Step

The post-treatment step is a step of obtaining polyarylene sulfide by removing unnecessary components from the slurry obtained in the polymerization step. The post-treatment step in the method of producing PAS of an embodiment of the present invention is not limited as long as the step is a step typically used in production of PAS.

After the completion of the polymerization reaction, a slurry containing the polymer (hereinafter, also referred to as "product slurry") may be obtained by cooling the reaction mixture, for example. The cooled product slurry is separated by filtration as is or after diluted with water or the like, then washed and filtered repeatedly, and dried, whereby PAS can be recovered.

According to the method of producing PAS of an embodiment of the present invention, a granular PAS can be produced especially in the case where the polymerization reaction is continued in the condition where the reaction system is phase-separated into a concentrated polymer phase and a dilute polymer phase in the presence of a phase separation agent in the second-stage polymerization step. Thus, a method by which the granular polymer is separated from the reaction solution by a method of sieving using a screen is preferable from the perspective of easily separating the polymer from byproducts, oligomers, and the like. As a result, the granular PAS of 30 μm or greater, preferably 35 μm or greater, and particularly preferably 50 μm or greater, can be effectively retrieved. Note that, with the product slurry, the polymer may be sieved as is at a high temperature.

According to the method of producing PAS of an embodiment of the present invention, when the polymerization reaction is performed in a homogeneous liquid phase condition, especially, in the first-stage polymerization step and the second-stage polymerization step, fine powder PAS can be produced. Thus, the fine powder polymer can be isolated from the reaction solution by various solid-liquid separation methods. This fine powder PAS has a narrow particle size distribution and high homogeneity. Therefore, sieving is not necessary to control the particle size distribution for this fine powder PAS.

After various solid-liquid separation, the PAS is preferably washed with the organic amide solvent, which is the same as the polymerization solvent, or an organic solvent, such as ketones (e.g. acetone) and alcohols (e.g. methanol). The PAS may be washed with hot water at a high temperature. The produced PAS may be treated with acids or salts, such as ammonium chloride.

Obtained PAS

According to the method of producing PAS of the present invention, formation of byproduct is suppressed, and high quality PAS having less impurities can be obtained. As the PAS obtained by the production method of the present invention, PAS with excellent handleability can be obtained at a high yield by setting the average particle size to typically 10 to 5000 preferably 30 to 4000 and even more preferably 50 to 3000 and a melt viscosity, measured at a temperature of 310° C. and a shear rate of 1216 sec$^{-1}$, to typically 0.1 to 3000 Pa·s, preferably 0.5 to 2000 Pa·s, more preferably 1 to 1000 Pa·s, and even more preferably 5 to 500 Pa·s. Note that the melt viscosity of PAS can be measured by using approximately 20 g of dried polymer and using a capirograph at a predetermined temperature and shear rate.

The PAS obtained by the method of producing PAS of an embodiment of the present invention is high quality PAS having less impurities. An example of the indication of high quality is a nitrogen content in the PAS. According to the method of producing PAS of an embodiment of the present invention, preferably, PAS having a nitrogen content of 600 ppm or less in the PAS can be obtained. The nitrogen content in the PAS is more preferably 590 ppm or less, and even more preferably 580 ppm or less. Although the lower limit of the nitrogen content in the PAS is of course 0 ppm, in many cases, the lower limit may be approximately 10 ppm.

The nitrogen content in the PAS can be measured by precisely weighing approximately 1 mg of a polymer sample and performing elemental analysis using a trace nitrogen and sulfur analyzer.

The PAS obtained by the method of producing PAS of an embodiment of the present invention can be formed into various injection molded products or extrusion molded products, such as sheets, films, fibers, and pipes, as is or after undergoing oxidative-crosslinking, alone or by blending with various inorganic fillers, fibrous fillers, and various synthetic resins, as desired.

The PAS obtained by the method of producing PAS of an embodiment of the present invention exhibits excellent color tone. Furthermore, the PAS compound obtained by the production method of an embodiment of the present invention produces a less amount of volatile components and is suitable for fields, such as electronic devices, where suppression of volatile components is expected.

In the method of producing PAS of an embodiment of the present invention, the PAS is not limited and is preferably polyphenylene sulfide (PPS).

The present invention is not limited to the embodiments described above, and various modifications are possible within the scope indicated in the claims. Embodiments obtained by appropriately combining the technical means disclosed by the embodiments are also included in the technical scope of the present invention. In addition, all of the documents disclosed in the present specification are hereby incorporated by reference.

EXAMPLES

Embodiments of the present invention will be described in further detail hereinafter using examples. The present invention is not limited to the examples below, and it goes without saying that various aspects are possible with regard to the details thereof.

Melt Viscosity

The melt viscosity was measured by using approximately 20 g of dried polymer and the Capirograph 1-C, available from Toyo Seiki Seisaku-sho, Ltd. At this time, a flat die having a diameter of 1 mm and a length of 10 mm was used as the capillary, and the temperature was set to 310° C. The polymer sample was introduced into the instrument, and after the sample was held for 5 minutes, the melt viscosity (hereinafter, also referred to as "MV") at a shear rate of 1216 sec$^{-1}$ was measured (unit: Pa·s).

Yield of Polymer

As the yield of the PAS (hereinafter, also simply referred to as "polymer"), a proportion of the polymer mass actually recovered relative to a reference value, which was the polymer mass (theoretical amount) assuming that all the effective sulfur source present in the reactor after the dehydration step were converted to the polymer, was calculated and used as the yield of the polymer (unit: mass %).

pH of Mixture

The mixture was diluted 10 times using purified water (available from Kanto Chemical Co., Inc.) and then measured at room temperature using a pH meter.

Amount of Sulfur Source

For the sulfur source containing the sodium hydrosulfide (NaSH) and sodium sulfide ($Na_2S$) as the sulfur content, the total amount of the sulfur content was determined by the iodimetry, and the amount of NaSH in the sulfur source was determined by the neutralization titration. The value obtained by subtracting the amount of NaSH from the total amount of the sulfur content was used as the amount of $Na_2S$.

Example 1

1. Dehydration Step

As the sulfur source, 2003 g of sodium hydrosulfide (NaSH) aqueous solution having the analytical value by iodimetry of 62.5 mass % was used. The analytical value of NaSH by neutralization titration of this sulfur source was 61.09 mass % (22.26 mol), and 0.25 mol of sodium sulfide ($Na_2S$) was contained therein. The sodium hydrosulfide aqueous solution described above and 952 g of 73.3 mass % sodium hydroxide (NaOH) aqueous solution were charged in a 20 L autoclave (reactor), in which the inner side was lined with titanium, together with 6004 g of N-methylpyrrolidone (NMP). When the sulfur source formed from the sodium hydrosulfide and the sodium sulfide is denoted as "S", NaOH/S before the dehydration was 0.85 (mole/mole; hereinafter, also referred to as "mol/mol"). After the inside of the reactor was purged with nitrogen gas, the temperature was gradually raised to 200° C. over a period of approximately two hours while the contents in the reactor were being stirred, thereby 935 g of water and 701 g of NMP were distilled. At this time, 0.48 mol of hydrogen sulfide ($H_2S$) was volatilized. Therefore, the effective S amount (i.e. amount of "charged sulfur source") in the reactor after the dehydration step was 21.85 mol. The volatilized $H_2S$ content corresponded to 2.16 mol % relative to the sulfur source charged in the reactor.

2. Preparation Step

After the dehydration step, the reactor was cooled to a temperature of 170° C., and 3292 g of p-dichlorobenzene (hereinafter, also referred to as "pDCB") (pDCB/effective S=1.025 (mol/mol)), 2891 g of NMP (NMP/effective S=375 (g/mol)), and 156 g of water were added. Furthermore, NaOH with a purity of 97 mass % was added in a manner that NaOH in reactor/effective S=0.85 (mol/mol) to obtain a preparation mixture (total water content in reactor/S=1.5 (mol/mol)).

3. Polymerization Step

While the preparation mixture was stirred by rotating a stirrer installed in the reactor, the temperature was continuously raised from 220° C. to 250° C. over 75 minutes to perform polymerization (first-stage polymerization step). The pDCB conversion ratio was 78%, and the pH at the completion of the first-stage polymerization was 10.1.

Thereafter, to form a condition where the reaction system was separated into a concentrated polymer phase and a dilute polymer phase in the presence of water as a phase separation agent, 445 g of water and 1667 g of NaOH were charged under pressure (total water content in reactor/S=2.63 (mol/mol); total NaOH/effective S=1.035 (mol/mol)), and then the temperature was raised to 265° C. to continue the polymerization reaction for 2 hours (second-stage polymerization step). After the completion of the polymerization reaction, the reaction mixture was cooled to room temperature, and using a part thereof as a sample, the produced amount of byproducts in the PAS polymerization reaction solution was measured.

4. Post-Treatment Step

After the reaction mixture was cooled to room temperature following the completion of the polymerization reaction, the polymer was passed through a 100-mesh screen. The separated polymer on the screen was washed three times with acetone, then washed three times with water, washed with 0.3 mass % acetic acid, and washed four times with water to obtain a washed polymer. The washed polymer was dried at a temperature of 105° C. for 13 hours. The yield of the granular polymer obtained as described above was 91%. The characteristics of the polymer are shown in Table 1 together with the produced amount of byproducts and the like.

Example 2

The granular polymer was obtained in the same manner as in Example 1 except for performing the polymerization in a condition that pDCB/effective S=1.04 (mol/mol) while the temperature was continuously increasing from 220° C. to 240° C. over 60 minutes (conversion ratio of pDCB in the first-stage polymerization step was 72%, and the pH at the completion of the first-stage polymerization was 10.8) and then in a condition that total NaOH/effective S=1.05 (mol/mol), and the yield of the granular polymer was 91%. The characteristics of the polymer are shown in Table 1 together with the produced amount of byproducts and the like.

Example 3

The granular polymer was obtained in the same manner as in Example 1 except for performing the polymerization in a condition that pDCB/effective S=1.05 (mol/mol) and NaOH in reactor/effective S=0.80 (mol/mol) while the temperature was continuously increasing from 220° C. to 230° C. over 40 minutes (conversion ratio of pDCB in the first-stage polymerization step was 60%, and the pH at the completion of the first-stage polymerization was 10.9) and then in a condition that total NaOH/effective S=1.055 (mol/mol), and the yield of the granular polymer was 88%. The characteristics of the polymer are shown in Table 1 together with the produced amount of byproducts and the like.

Comparative Example 1

The polymerization reaction, post-treatment, and drying were performed in the same manner as in Example 1 except for employing pDCB/effective S=1.055 (mol/mol) and total NaOH/effective S=1.065 (mol/mol) in the preparation step, performing the polymerization while the temperature was continuously increasing from 220° C. to 260° C. over 90 minutes (conversion ratio of pDCB in the first-stage polymerization step was 90%, and the pH at the completion of the first-stage polymerization was 11.7), and charging only water under pressure in the second-stage polymerization. The yield of the granular polymer obtained as described above was 86%. The characteristics of the polymer are shown in Table 1 together with the produced amount of byproducts and the like.

Comparative Example 2

The polymerization reaction, post-treatment, and drying were performed in the same manner as in Comparative Example 1 except for performing the polymerization while the temperature was continuously increasing from 220° C. to 250° C. over 75 minutes (conversion ratio of pDCB in the first-stage polymerization step was 78%, and the pH at the completion of the first-stage polymerization was 11.9). The yield of the fine powder polymer obtained as described above was 83%. The characteristics of the polymer are shown in Table 1 together with the produced amount of byproducts and the like.

TABLE 1

|  | Example 1 | Example 2 | Example 3 | Comparative Example 1 | Comparative Example 2 |
|---|---|---|---|---|---|
| Charged pDCB/S | 1.025 | 1.040 | 1.050 | 1.055 | 1.055 |
| First-stage NaOH/S | 0.85 | 0.85 | 0.80 | 1.065 | 1.065 |
| First-stage conversion ratio (%) | 78 | 72 | 60 | 90 | 78 |
| pH at completion of first-stage | 10.1 | 10.8 | 10.9 | 11.7 | 11.9 |
| Second-stage NaOH/S | 1.035 | 1.050 | 1.055 | 1.065 | 1.065 |
| Yield (%) | 91 | 91 | 88 | 86 | 83 |
| MV (Pa · s) | 35 | 26 | 30 | 24 | 21 |
| Added amount of NaOH$^{Note}$ | 0.185 | 0.200 | 0.255 | 0 | 0 |
| Particle size (μm) | 395 | 370 | 358 | 403 | 420 |
| N content (ppm) | 450 | 550 | 575 | 610 | 640 |
| CPMABA amount in slurry (ppm) | 5850 | 6630 | 6610 | 9490 | 9500 |

$^{Note)}$Second-stage NaOH/S − first-stage NaOH/S

INDUSTRIAL APPLICABILITY

The method of producing PAS according to an embodiment of the present invention can be used as a suitable method of producing PAS that is widely used as an engineering plastic in fields, such as electric/electronic devices, and devices for automobiles.

The invention claimed is:

1. A method of polymerizing a dihalo aromatic compound and a sulfur source to produce polyarylene sulfide, the method comprising:
preparing a mixture comprising an organic amide solvent, a sulfur source, a dihalo aromatic compound, and an alkali metal hydroxide in an amount that is less than an equimolar amount per 1 mol of the sulfur source, wherein a pH of a mixture is greater than 12.5 and at most 14;
in a first-stage polymerization, initiating the polymerizing by heating the mixture to a temperature of 170° C. to 270° C. and producing a prepolymer until the pH of the mixture reaches a range of 10 to 11 and the conversion of the dihalo aromatic compound reaches 50% or greater to produce a polymerization mixture;
in a second-stage polymerization, 1) adding from 0.01 to 0.6 mol of alkali metal hydroxide per 1 mol of the sulfur source to the polymerization mixture and continuing polymerization at a temperature of 245 to 290° C., and 2) adding a phase-separation agent at an amount of 0.01 to 20 mol per 1 kg of organic amide solvent to phase-separate the polymerization mixture into a concentrated polymer phase comprising dissolved polyarylene sulfide and a dilute polymer phase comprising organic amide solvent, wherein the polymerization reaction time of the second-stage polymerization is in the range of from 10 minutes to 72 hours; and recovering polyarylene sulfide from the concentrated polymer phase.

2. The method according to claim 1, wherein in the first-stage polymerization step, the prepolymeris produced until a conversion ratio of the dihalo aromatic compound is from 50% to 98%.

3. The method according to claim 1, wherein in the preparation step, the mixture containing from 0.5 to 0.99 mol of the alkali metal hydroxide per 1 mol of the sulfur source is prepared.

4. The method according to claim 1, wherein the polymerization reaction is performed by heating the mixture prepared in the preparation step at a temperature of 180 to 265° C. in the first-stage polymerization step.

5. The method according to claim 1, wherein, in the first-stage polymerization step and the second-stage polymerization step before the addition of the phase-separation agent, the polymerization reaction is performed in a homogeneous liquid phase condition.

6. The method according to claim 1, wherein, in the first-stage polymerization step, additional alkali metal hydroxide is not added in the first-stage polymerization.

7. The method according to claim 1, wherein the pH of the mixture is at least 12.7.

* * * * *